(12) United States Patent
Nagata et al.

(10) Patent No.: US 9,465,454 B2
(45) Date of Patent: Oct. 11, 2016

(54) MOBILE TERMINAL DEVICE, STORAGE MEDIUM, AND METHOD FOR DISPLAY CONTROL OF MOBILE TERMINAL DEVICE

(71) Applicant: KYOCERA Corporation, Kyoto-shi, Kyoto (JP)

(72) Inventors: Shunsuke Nagata, Higashiosaka (JP); Hiroaki Honda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/083,100

(22) Filed: Mar. 28, 2016

(65) Prior Publication Data

US 2016/0209938 A1    Jul. 21, 2016

Related U.S. Application Data

(63) Continuation of application No. 13/614,690, filed on Sep. 13, 2012, now Pat. No. 9,329,642.

(30) Foreign Application Priority Data

Sep. 21, 2011  (JP) .................................. 2011-206640

(51) Int. Cl.
G06F 3/0346   (2013.01)
G06T 3/60     (2006.01)
G06F 1/16     (2006.01)

(52) U.S. Cl.
CPC .......... *G06F 3/0346* (2013.01); *G06F 1/1626* (2013.01); *G06T 3/60* (2013.01); *G06F 2200/1614* (2013.01)

(58) Field of Classification Search
None
See application file for complete search history.

(56) References Cited

U.S. PATENT DOCUMENTS 8,875,061 B1 * 10/2014 Lee ....................... G06F 3/0487
                                                          715/790
2008/0132283 A1    6/2008 Ponce De Leon
(Continued)

FOREIGN PATENT DOCUMENTS

JP   2003-298715 A   10/2003
JP   2006-066975 A    3/2006
(Continued)

OTHER PUBLICATIONS

Notification of Reasons for Refusal dated Nov. 11, 2014 issued in corresponding Japanese application No. 2011-206640.
Notification of Reasons for Refusal dated May 26, 2015, issued in counterpart Japanese Application No. 2011-206640.

*Primary Examiner* — James A Thompson
(74) *Attorney, Agent, or Firm* — Procopio Cory Hargreaves and Savitch LLP

(57)  ABSTRACT

A mobile terminal device includes: a display; a display control module which displays an execution screen for an application program on the display; and a detection module which detects a posture of the mobile terminal device based on a gravity acceleration applied to the mobile terminal device. In this arrangement, the display control module controls a display direction of the execution screen with respect to the mobile terminal device according to the posture of the mobile terminal device, and performs suppression control so as to, even if the posture of the mobile terminal device is changed, suppress switching of the display direction corresponding to the changed posture, provided that a suppression condition for suppressing switching of the display direction is satisfied while the execution screen is displayed on the display.

7 Claims, 10 Drawing Sheets

(56) References Cited

U.S. PATENT DOCUMENTS

| | | |
|---|---|---|
| 2009/0207184 A1 | 8/2009 | Laine et al. |
| 2010/0265269 A1 | 10/2010 | Matsuda |
| 2010/0285844 A1 | 11/2010 | Hosoi et al. |
| 2012/0147047 A1* | 6/2012 | Kim .................. G09G 5/00 345/649 |
| 2012/0274663 A1 | 11/2012 | Laine et al. |
| 2013/0083074 A1 | 4/2013 | Nurmi et al. |
| 2014/0009500 A1 | 1/2014 | Laine et al. |
| 2014/0300642 A1 | 10/2014 | Laine et al. |

FOREIGN PATENT DOCUMENTS

| | | |
|---|---|---|
| JP | 2008-005456 A | 1/2008 |
| JP | 2008-131616 A | 6/2008 |
| JP | 2010-263433 A | 11/2010 |
| JP | 2011-515884 A | 5/2011 |
| JP | 2012-044839 A | 4/2012 |
| JP | 2012-090028 A | 5/2012 |

* cited by examiner

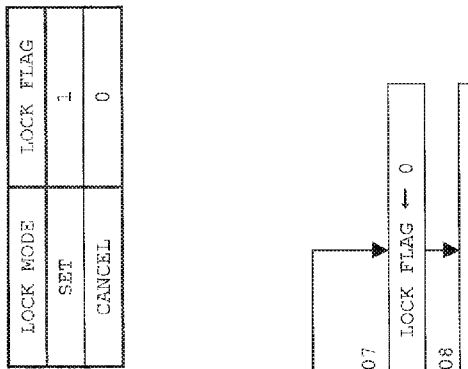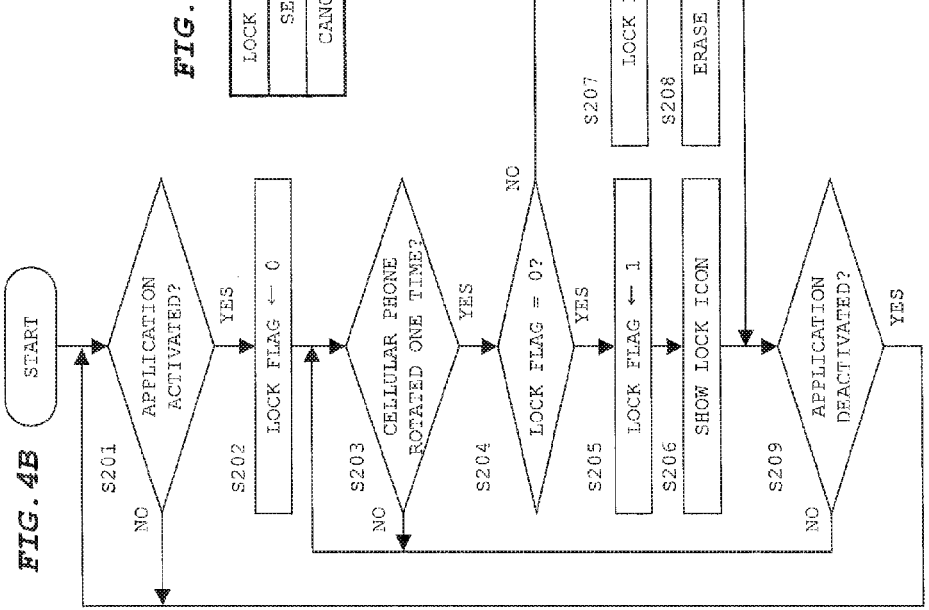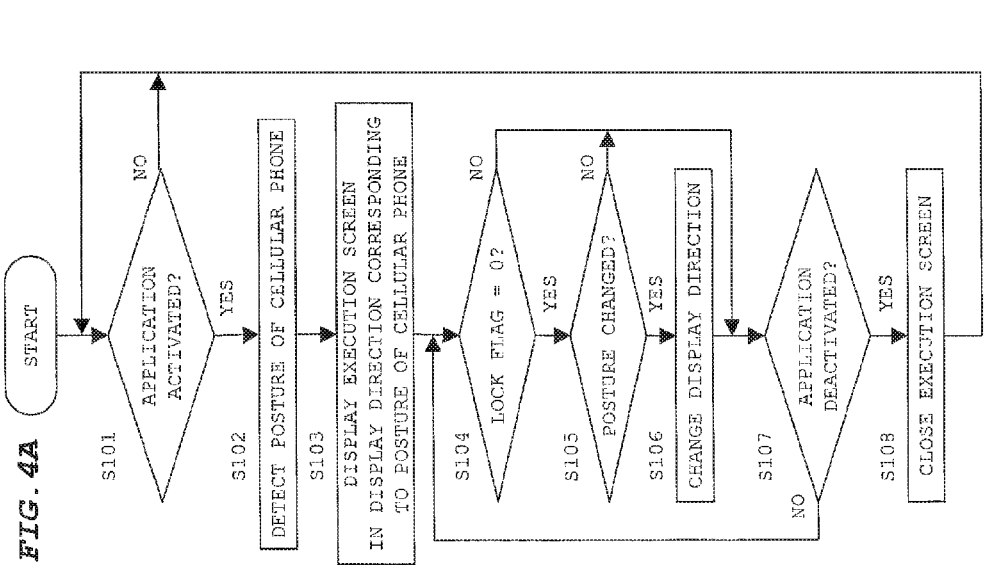

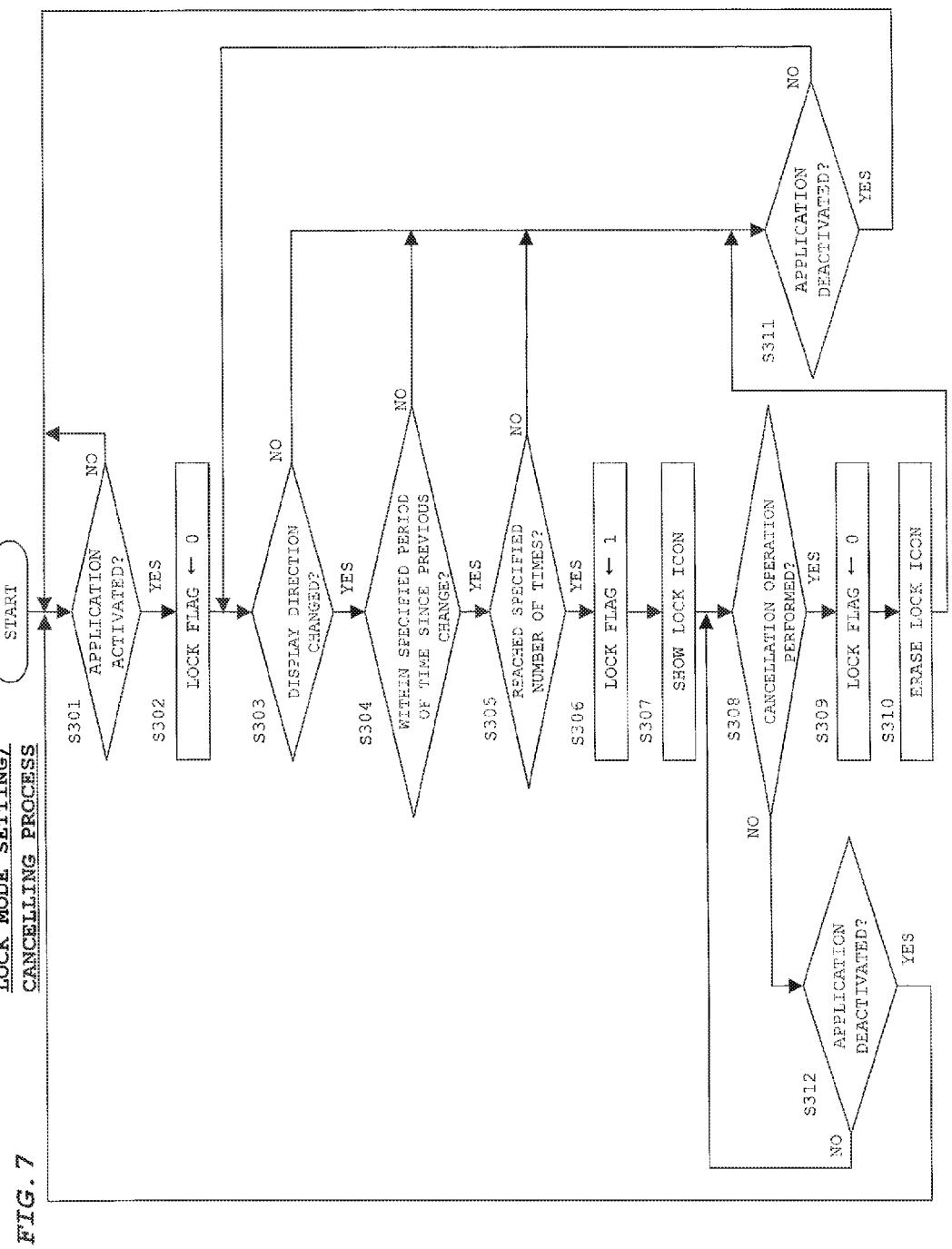

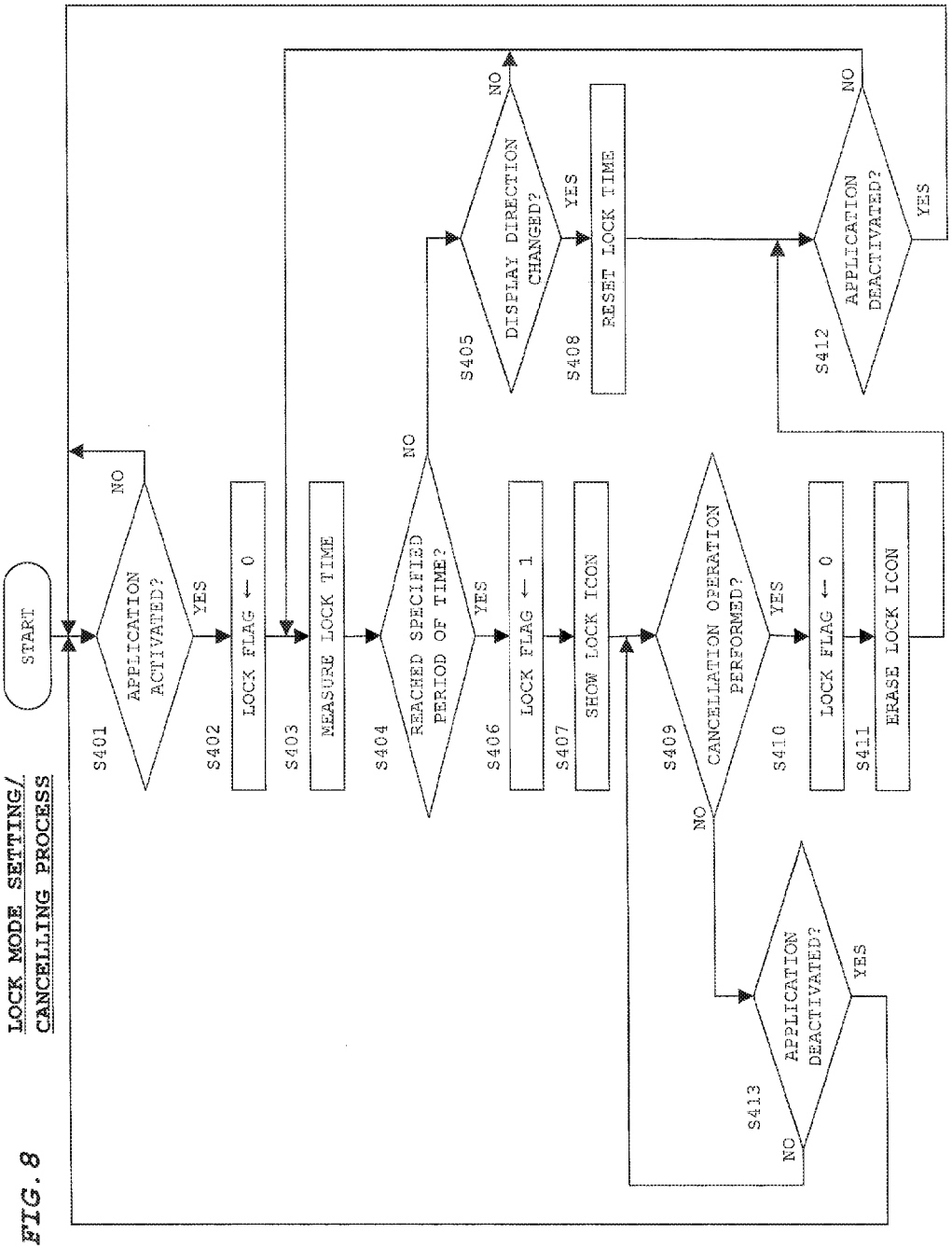

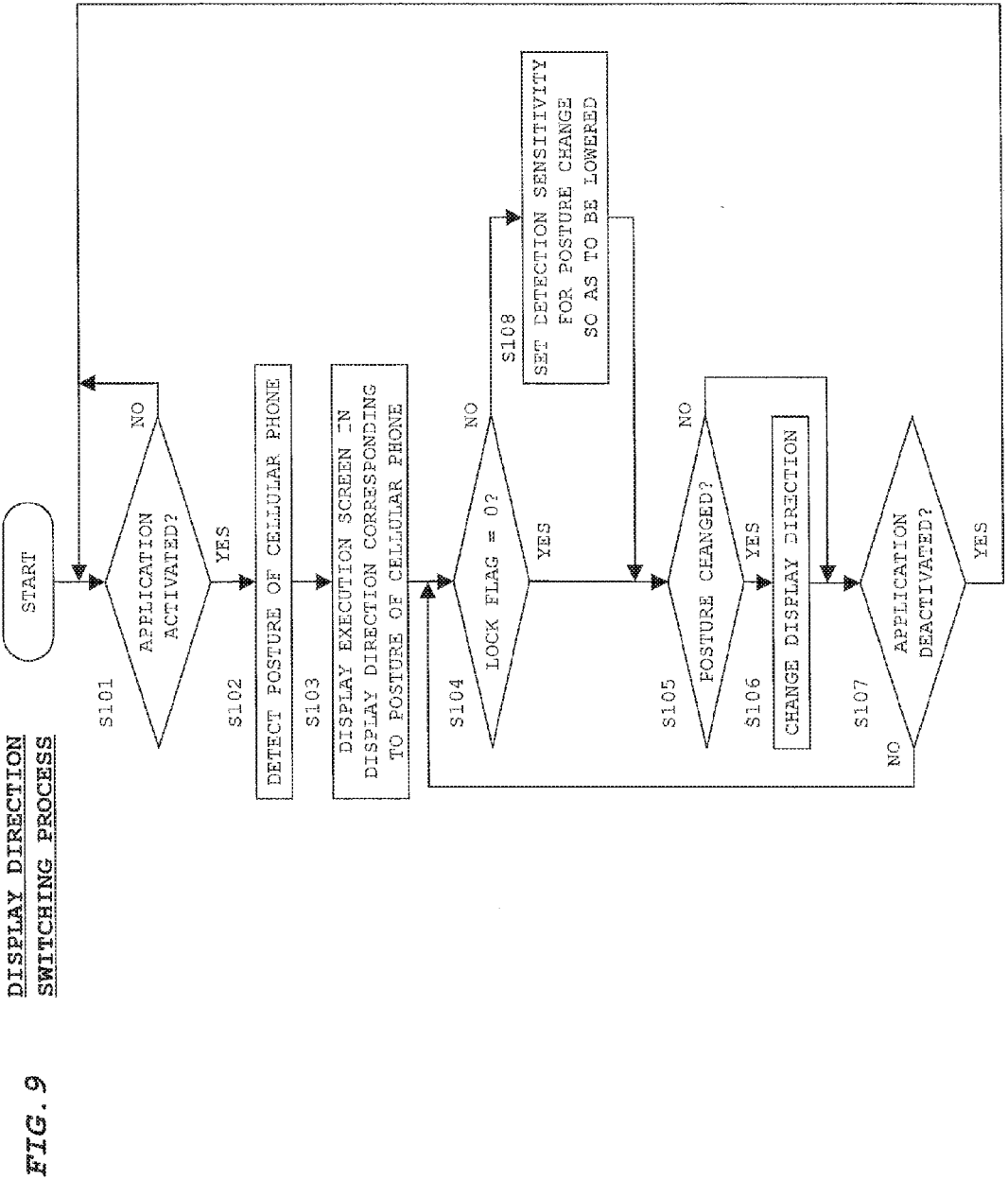

LOCK MODE SETTING/CANCELLING PROCESS

MOBILE TERMINAL DEVICE, STORAGE MEDIUM, AND METHOD FOR DISPLAY CONTROL OF MOBILE TERMINAL DEVICE

CROSS REFERENCE TO RELATED APPLICATIONS

The present application is a continuation of U.S. application Ser. No. 13/614,690 filed on Sep. 13, 2012, entitled "MOBILE TERMINAL DEVICE, STORAGE MEDIUM, AND METHOD FOR DISPLAY CONTROL OF MOBILE TERMINAL DEVICE", which claims the benefit of Japanese Patent Application No. 2011-206640 filed Sep. 21, 2011, entitled "MOBILE TERMINAL DEVICE, PROGRAM, AND METHOD FOR DISPLAY CONTROL". The contents of the above applications are each incorporated herein by reference in their entirety.

BACKGROUND OF THE INVENTION

1. Field of the Invention

The present invention relates to cellular phones, personal digital assistants (PDAs), tablet PCs, mobile terminal devices such as electronic book terminals, storage media holding computer programs preferably for use in the mobile terminal devices, and methods for display control of the mobile terminal devices.

2. Disclosure of Related Art

Conventionally, a mobile terminal device is equipped with various application programs (hereinafter, referred to as simply "applications"). When an application is executed, an execution screen for the application is displayed on a display surface of a display.

Such a mobile terminal device may be configured such that the display direction of the execution screen is changed with respect to the mobile terminal device according to the posture of the mobile terminal device, for improvement of convenience of users. For example, the mobile terminal device is provided with an acceleration sensor, whereby it is determined whether the mobile terminal device is in portrait or landscape orientation with respect to the ground, based on a gravity acceleration detected by the acceleration sensor. Accordingly, the execution screen is vertically displayed on the display surface, regardless of whether the mobile terminal device is in portrait or landscape orientation.

In the foregoing configuration, however, if the posture of the mobile terminal device is not changed with respect to the user but is changed with respect to the ground because a user lies down with the mobile terminal device in hand, the display direction of the execution screen may be switched without discretion in a manner for which it is difficult for the user to view the screen.

Accordingly, it is considered that a mobile terminal device is configured to suppress switching of display directions of the execution screen as necessary. In this case, it is desired to suppress switching of display directions without requiring the user's time and effort as much as possible.

SUMMARY OF THE INVENTION

A first aspect of the present invention relates to a mobile terminal device. The mobile terminal device according to this aspect includes: a display; a display control module which displays an execution screen for an application program on the display; and a detection module which detects a posture of the mobile terminal device based on a gravity acceleration applied to the mobile terminal device. In this arrangement, the display control module controls a display direction of the execution screen with respect to the mobile terminal device according to the posture of the mobile terminal device, and performs suppression control so as to, even if the posture of the mobile terminal device is changed, suppress switching of the display direction corresponding to the changed posture, provided that a suppression condition for suppressing switching of the display direction is satisfied while the execution screen is displayed on the display.

A second aspect of the present invention relates to a storage medium that holds a computer program applied to the mobile terminal device. The mobile terminal device has a display and displays an execution screen for an application program on the display. The computer program provides a computer in the mobile terminal device with a function to control a display direction of the execution screen with respect to the mobile terminal device according to a posture of the mobile terminal device, and to perform suppression control so as to, even if the posture of the mobile terminal device is changed, suppress switching of the display direction corresponding to the changed posture, provided that a suppression condition for suppressing switching of the display direction is satisfied while the execution screen is displayed on the display.

A third aspect of the present invention relates to a display control method for a mobile terminal device which has a display and displays an execution screen for an application program on the display. The display control method according to this aspect includes a control step of controlling a display direction of the execution screen with respect to the mobile terminal device according to a posture of the mobile terminal device, the control step including: a step of switching the display direction corresponding to the changed posture when the posture of the mobile terminal device is changed; and a step of performing suppression control so as to, even if the posture of the mobile terminal device is changed, suppress switching of the display direction corresponding to the changed posture, provided that a suppression condition for suppressing switching of the display direction is satisfied while the execution screen is displayed on the display.

BRIEF DESCRIPTION OF THE DRAWINGS

The foregoing and other objectives and novel features of the present invention will be more fully understood from the following description of preferred embodiments when reference is made to the accompanying drawings.

FIGS. 4A to 4C are diagrams for describing a display direction switching process and a lock mode setting/cancelling process according to the embodiment;

FIG. 7 is a flowchart showing a flow of a lock mode setting/cancelling process according to modification example 1;

FIG. 8 is a flowchart showing a flow of a lock mode setting/cancelling process according to modification example 2;

FIG. 9 is a flowchart showing a flow of a display direction switching process according to modification example 3.

However, the drawings are only for illustration and are not intended to limit the scope of the present invention.

DESCRIPTION OF PREFERRED EMBODIMENTS

An embodiment of the present invention will be described below with reference to the drawings.

In the embodiment, a display 11 is equivalent to a "display" recited in the claims. A CPU 100 is equivalent to a "display control module" and "mode control module" recited in the claims. The CPU 100 and an acceleration sensor 108 constitute a "detection module" recited in the claims. However, the foregoing correspondence between the claims and the description of the embodiment is merely one example and does not limit the claims to the embodiment.

Figure 1B:
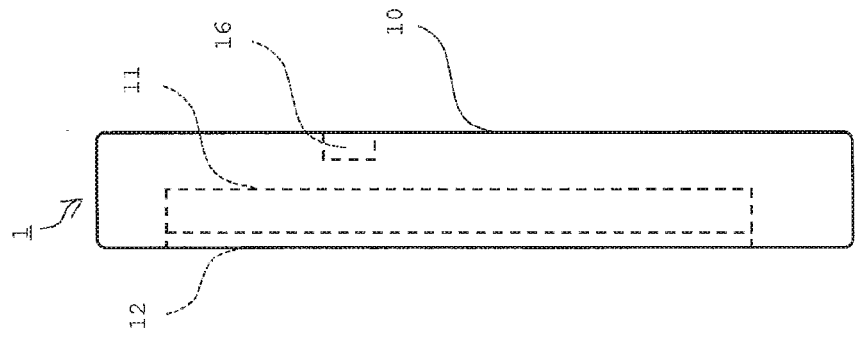
FIGS. 1A and 1B are diagrams showing an outer configuration of a cellular phone according to an embodiment of the present invention.
Figure 1A:
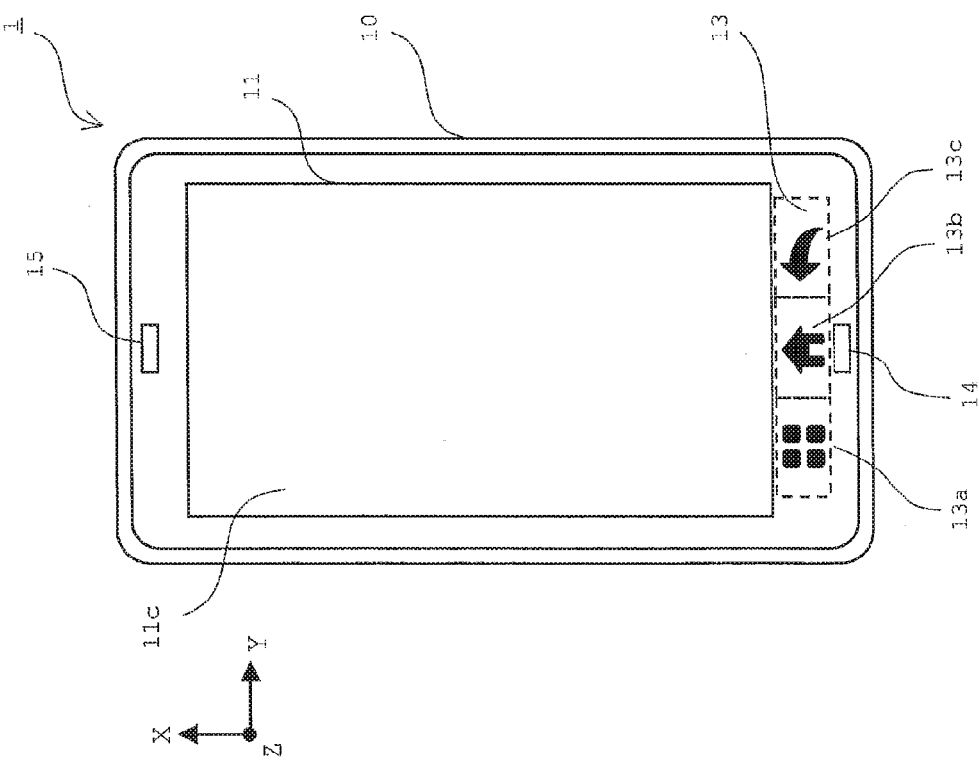

FIGS. 1A and 1B are diagrams showing an outer configuration of a cellular phone 1. FIGS. 1A and 1B are a front view and a side view, respectively.

The cellular phone 1 has a rectangular cabinet 10 with a small thickness. The cabinet 10 has a touch panel on a front side thereof. The touch panel includes a display 11 and a touch sensor 12 laid on the display 11.

Figure 2:
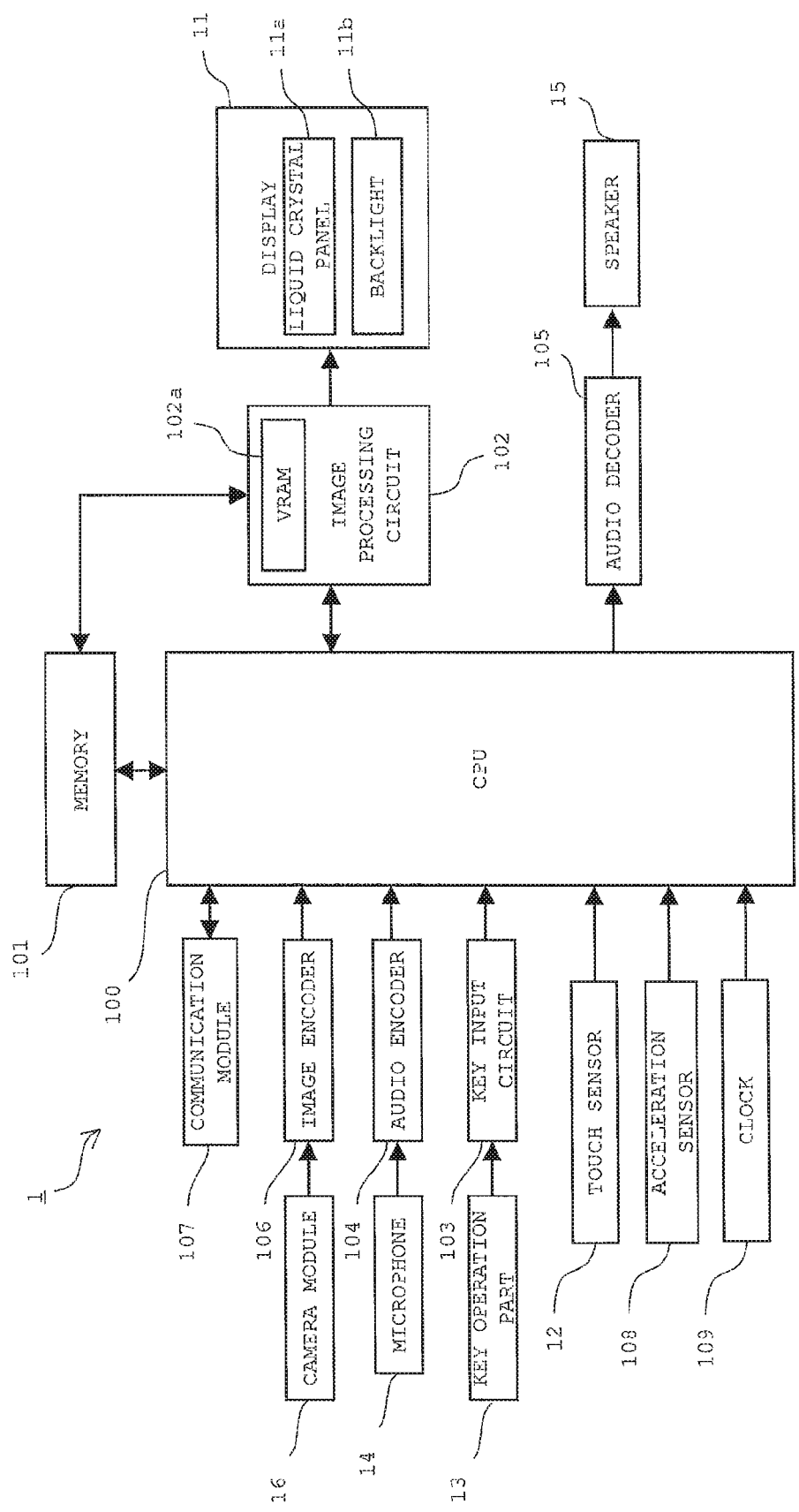
FIG. 2 is a block diagram showing an entire configuration of the cellular phone according to the embodiment.

The display 11 is formed by a liquid crystal panel 11a and a backlight 11b illuminating the liquid crystal panel 11a (refer to FIG. 2). The liquid crystal panel 11a has a display surface 11c for displaying images, and the display surface 11c is exposed to outside. A home screen on which a large number of icons for application programs (hereinafter, abbreviated as "applications") are arranged and execution screens for applications are displayed on the display surface 11c. Instead of the liquid crystal panel 11a, any other display element may be used such as an organic EL.

The touch sensor 12 is placed on the display surface 11c. The touch sensor 12 is formed as a transparent sheet, and thus a user can see the display surface 11c through the touch sensor 12. The touch sensor 12 detects a position on the display surface 11c touched by the user (hereinafter, referred to as "input position"), and outputs a position signal according to the input position to a CPU 100 described later. Touching the display surface 11c actually refers to touching a region on a surface of a cover covering the touch sensor 12 corresponding to the display surface 11c.

The touch sensor 12 is a capacitance-type touch sensor which includes first transparent electrodes and second transparent electrodes aligned in a matrix, and a cover. The touch sensor 12 detects the input position by sensing a change in capacitance between the first transparent electrodes and the second transparent electrodes.

The touch sensor 12 is not limited to a capacitance-type touch sensor but may be any other touch sensor of ultrasonic type, pressure-sensitive type, resistance film-type, light detecting-type, or the like.

The user can perform various operations such as touching, tapping, flicking, or the like, on the display surface 11c with the use of a contact member such as his/her finger or a pen (hereinafter, to simplify, referred to as simply a "finger").

The touch panel has a key operation part 13 at a lower part thereof. Specifically, touch keys 13a to 13c are formed by a home key 13a, a setting key 13b, and a back key 13c. The home key 13a is designed to display the home screen on the display surface 11c. The setting key 13b is designed to display a setting screen for making various settings on the display surface 11c. The back key 13c is designed to return from a screen currently displayed on the display surface 11c to the previous one during execution of an application.

The cabinet 10 has on a front side thereof a microphone 14 at a lower part and a speaker 15 at an upper part. The user can conduct communications by listening to voices of a conversational partner from the speaker 15 and letting out his/her voices to the microphone 14.

The cabinet 10 has a camera module 16 on a back side thereof. The cabinet 10 has on a back surface thereof a lens window through which images of subjects are taken into the camera module 16.

FIG. 2 is a block diagram showing an entire configuration of the cellular phone 1. In addition to the foregoing components, the cellular phone 1 of the embodiment includes the CPU 100, a memory 101, an image processing circuit 102, a key input circuit 103, an audio encoder 104, an audio decoder 105, an image encoder 106, a communication module 107, an acceleration sensor 108, and a clock 109.

The image processing circuit 102 generates images to be displayed on the display 11 according to control signals from the CPU 100, and stores image data in a VRAM 102a.

The image processing circuit 102 outputs image signals containing the image data stored in the VRAM 102a, to the display 11. The image processing circuit 102 also outputs control signals for controlling the display 11 to turn on or off the backlight 11b of the display 11. Accordingly, light emitted from the backlight 11b is modulated by the liquid crystal panel 11a according to the image signals, whereby the images are displayed on the display surface 11c of the display 11.

The key input circuit 103, when any of the keys in the key operation part 13 is pressed, outputs a signal corresponding to the pressed key to the CPU 100.

The audio encoder 104 converts audio signals output from the microphone 14 according to collected sounds, into digital audio signals, and outputs the digital audio signals to the CPU 100.

The audio decoder 105 subjects the audio signals from the CPU 100 to a decoding process and D/A conversion, and outputs the converted analog audio signals to the speaker 15.

The communication module 107 includes an antenna transmitting and receiving radio waves for telephone calls and telecommunications. The communication module 107 converts signals input from the CPU 100 into radio signals, and transmits via the antenna the converted radio signals to the other end of communications such as a base station or another communication device, etc. The communication module 107 also converts the radio signals received via the antenna into signals in a form that allows the CPU 100 to utilize the signal, and outputs the converted signals to the CPU 100.

The acceleration sensor 108 detects an acceleration applied to the cellular phone 1. The acceleration sensor 108 is a triaxial acceleration sensor which detects accelerations generating in three directions: X-axis, Y-axis, and Z-axis directions shown in FIG. 1A. The acceleration sensor 108 outputs acceleration signals according to the detected accelerations to the CPU 100. When the cellular phone 1 is in a stationary state, the acceleration sensor 108 detects a gravity acceleration applied to the cellular phone 1.

The clock 109 measures time and outputs a signal according to the measured time to the CPU 100.

The memory 101 includes a ROM and a RAM. The memory 101 stores control programs for providing the CPU 100 with control functions, and various applications. The memory 101 is also used as a working memory that stores various kinds of data temporarily used or generated during execution of an application.

The CPU 100 controls components such as the camera module 16, the microphone 14, the communication module 107, the display 11, and the speaker 15, etc. according to the control programs, thereby to execute various applications for communications, camera functions, e-mail, web browser, map, music player, and the like.

The CPU 100 detects whether the cellular phone 1 is in landscape or portrait orientation with respect to the ground, according to an acceleration signal from the acceleration sensor 108.

FIGS. 3A to 3D are diagrams for describing display directions of a screen on the display 11 with changes in the posture of the cellular phone 1.

Figure 3B:
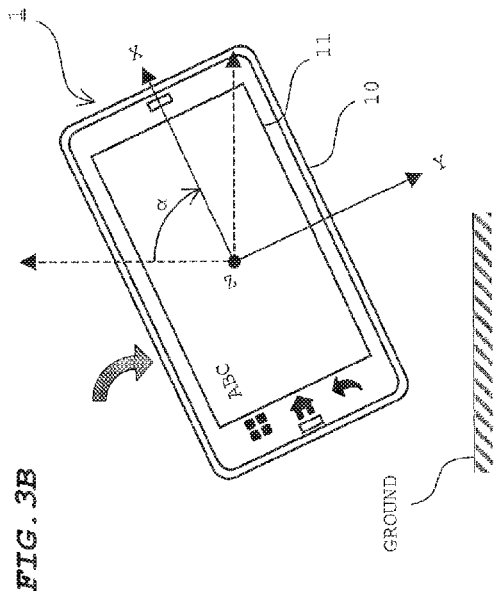
FIGS. 3A to 3D are diagrams for describing display directions of a screen on a display with changes in the posture of the cellular phone according to the embodiment.
Figure 3D:
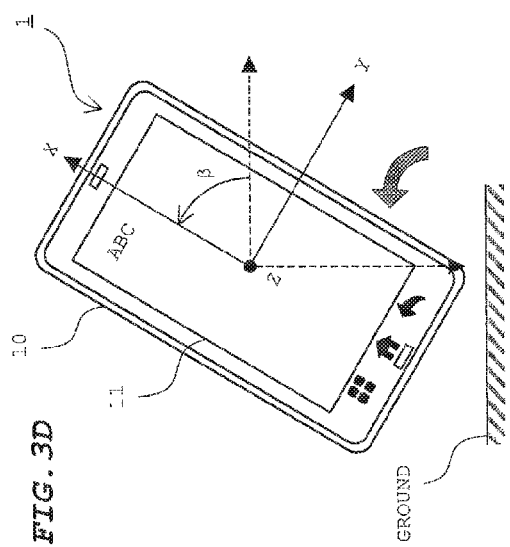
Figure 3A:
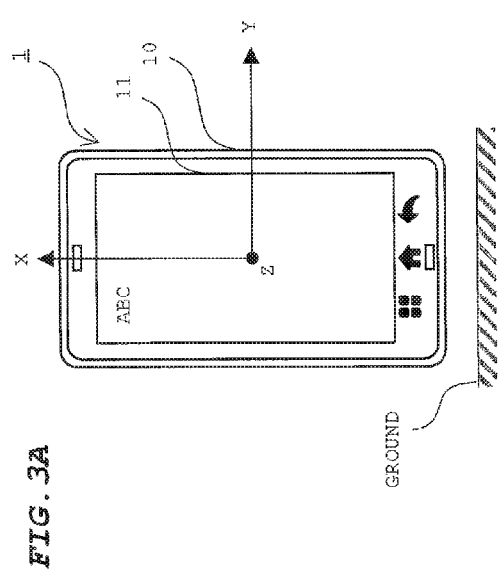
Figure 3C:
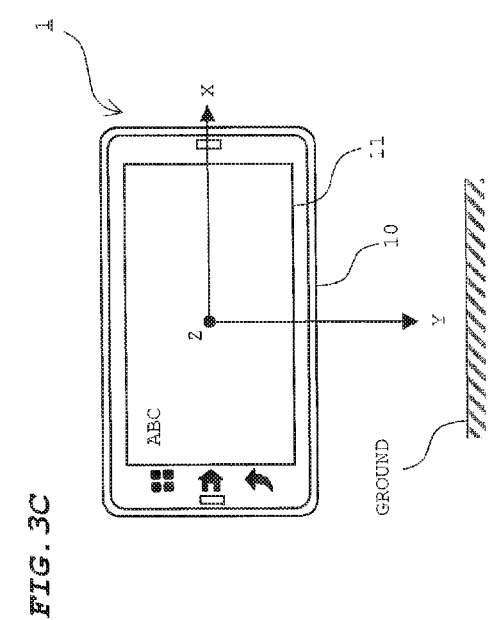

As shown in FIG. 3A, when the cellular phone 1 is in portrait orientation, the long side of the cellular phone 1 is made along the up-down direction. In this arrangement, the display direction of the screen (images) on the display 11 with respect to the cellular phone 1 is made along the long side. On the other hand, as shown in FIG. 3C, when the cellular phone 1 is in landscape orientation, the short side of the cellular phone 1 is made along the up-down direction. In this arrangement, the display direction of the screen (images) on the display 11 with respect to the cellular phone 1 is made along the short side.

When the cellular phone is inclined and changed from portrait to landscape orientations and an inclination angle thereof reaches an threshold angle α (hereinafter, referred to as "vertical critical angle α") as shown in FIG. 3B, the CPU 100 detects that the cellular phone 1 is switched to the landscape orientation. According to the result of the detection that the cellular phone 1 is switched to the landscape orientation, the display direction of images (screen) on the display 11 with respect to the cellular phone 1 is made along the short side as shown in FIG. 3B.

Meanwhile, when the cellular phone is inclined and changed from landscape to portrait orientations and an inclination angle thereof reaches an threshold angle β (hereinafter, referred to as "lateral critical angle β") as shown in FIG. 3D, the CPU 100 detects that the cellular phone 1 is switched to the portrait orientation. According to the result of the detection that the cellular phone 1 is switched to the portrait orientation, the display direction of images (screen) on the display 11 with respect to the cellular phone 1 is made along the long side as shown in FIG. 3D.

One of the portrait and landscape orientations corresponds to a first orientation in the present invention, and the other corresponds to a second orientation in the present invention.

The cellular phone 1 of the embodiment has a function to change the display direction of images displayed on the display 11, in particular, the display direction of an execution screen for an application, according to the posture of the cellular phone 1, as shown in FIGS. 3A to 3D. Accordingly, the execution screen can be automatically displayed on the display 11 in a vertical direction with respect to the ground, even if the cellular phone 1 is in portrait or landscape orientation. This allows the user to easily view the execution screen.

However, when the cellular phone 1 has the foregoing function, if the posture of the cellular phone 1 is not changed with respect to the user but is changed with respect to the ground because the user lies down with the cellular phone 1 in hand or the like, the display direction of the execution screen may be switched without discretion in a manner for which it is difficult for the user to view the screen.

Accordingly, in the embodiment, the cellular phone 1 has a function to lock the display direction according to the user's operation, thereby to prevent the display direction from being switched without discretion.

To realize the foregoing function, the CPU 100 performs a display direction switching process to switch the display direction of the execution screen for an application according to the posture of the cellular phone 1. Further, the CPU 100 performs a lock mode setting/cancelling process to set or cancel a lock mode for locking the display direction.

As one of the foregoing control programs, the memory 101 stores a program for the display direction switching process and the lock mode setting/cancelling process. The CPU 100 executes the display direction switching process and the lock mode setting/cancelling process, according to these programs.

Figure 5:
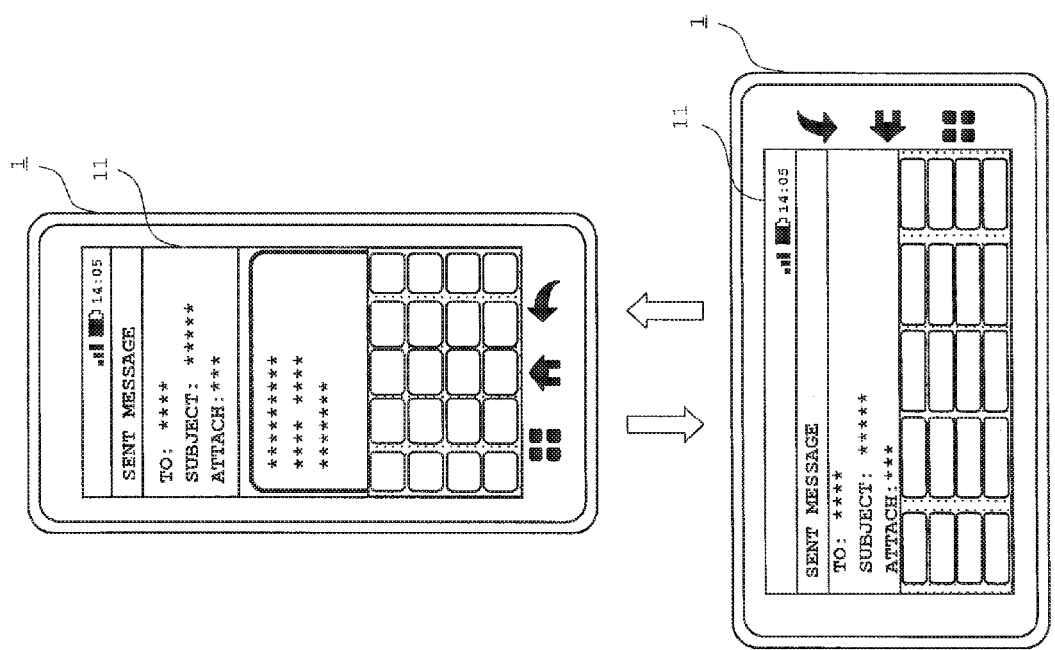
FIG. 5 is a diagram showing a display form of an execution screen with a change in the posture of the cellular phone in a state where a lock mode is cancelled according to the embodiment.
Figure 6A:
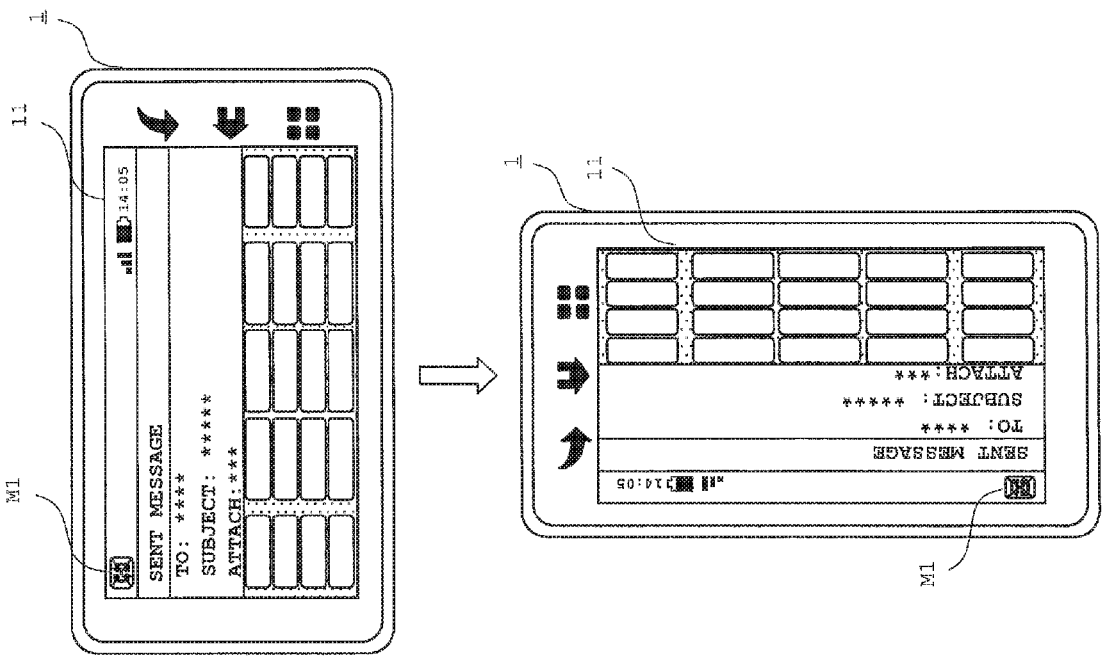
FIGS. 6A and 6B are diagrams showing display forms of an execution screen with changes in the posture of the cellular phone in a state where the lock mode is set according to the embodiment.
Figure 6B:
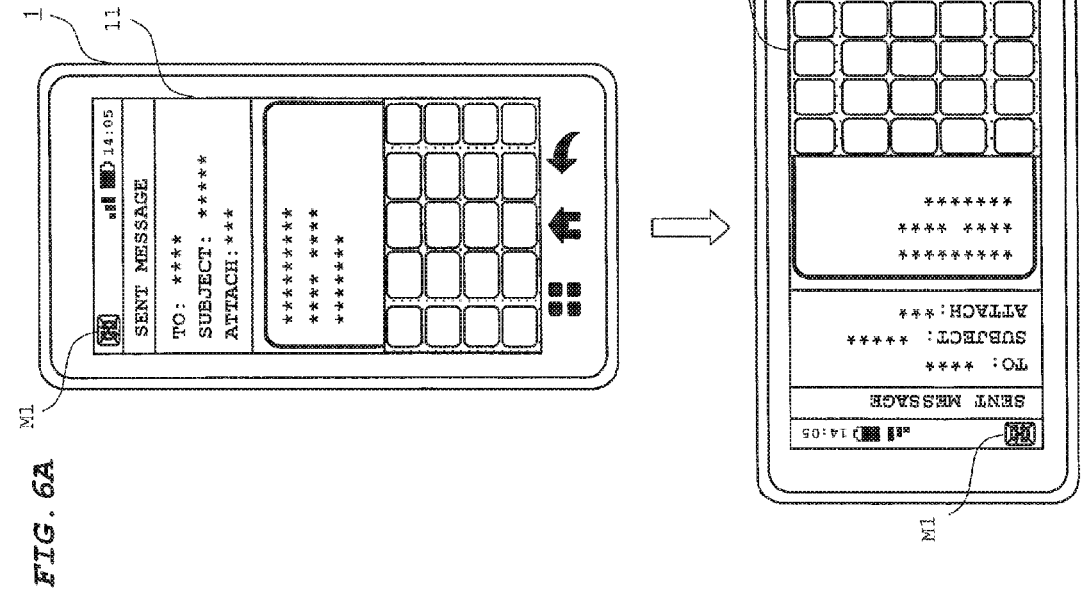

FIG. 4A is a flowchart showing a flow of the display direction switching process. FIG. 4B is a flowchart showing a flow of the lock mode setting/cancelling process. FIG. 4C is a diagram showing a relationship between the lock mode and flag status. FIG. 5 is a diagram showing a display form of the execution screen with a change in the posture of the cellular phone 1 in a state where the lock mode is cancelled. FIGS. 6A and 6B are diagrams showing a display form of the execution screen with a change in the posture of the cellular phone 1 in a state where the lock mode is set. FIG. 5 and FIGS. 6A and 6B are diagrams showing examples in which an application for e-mail is executed and a mail creation screen is displayed as an execution screen on the display 11.

Referring to FIG. 4A, the CPU 100 monitors whether one application is activated (S101). For example, when the home screen is displayed on the display 11, if the user touches an icon corresponding to one application on the home screen, the CPU 100 determines that the application is activated (S101: YES). If the application is still closed, the CPU 100 starts the application. If the application is already started but is suspended (in a sleep mode), the CPU 100 cancels the suspension. Then, the CPU 100 detects the posture of the cellular phone 1 (S102), and displays the execution screen for the application on the display 11 in a display direction corresponding to the detected posture (S103). Specifically, as shown in FIG. 5, if the cellular phone 1 is in portrait orientation, the execution screen is displayed in the display direction along the long side of the cellular phone 1, and if the cellular phone 1 is in landscape orientation, the execution screen is displayed in the display direction along the short side of the cellular phone 1.

Next, the CPU 100 determines the status of a lock flag (S104). The lock flag indicates whether the lock mode is set or cancelled. As shown in FIG. 4C, if the lock flag is set to "1," the lock mode is set, and if the lock flag is set to "0," the lock mode is cancelled.

If the lock flag is set to "0" and the lock mode is cancelled (S104: YES), the CPU 100 determines whether the posture of the cellular phone 1 is changed (S105). Then, if determining that the posture is changed (S105: YES), the CPU 100 changes the display direction of the execution screen (S106).

As shown in FIG. 5, for example, if the cellular phone 1 is changed from portrait to landscape orientations, the display direction of the execution screen is switched from the direction along the long side of the cellular phone 1 to the direction along the short side of the cellular phone 1. Also as shown in FIG. 5, if the cellular phone 1 is changed from landscape to portrait orientations, the display direction of the execution screen is switched from the direction along the short side of the cellular phone 1 to the direction along to the long side of the cellular phone 1.

Meanwhile, if the lock flag is set to "1" and the lock mode is set (S104: NO), the CPU 100 does not detect the posture of the cellular phone 1 or change the display direction of the execution screen.

As shown in FIG. 6A, for example, even if the cellular phone 1 is changed from portrait to landscape orientations, the display direction of the execution screen remains along the long side of the cellular phone 1. In addition, as shown in FIG. 6B, even if the cellular phone 1 is changed from landscape to portrait orientations, the display direction of the execution screen remains along the short side of the cellular phone 1.

Accordingly, the CPU 100 repeats steps S104 to S106 while the application is activated (S107: NO) and the execution screen for the application is displayed on the display 11, and when the lock mode is cancelled, the CPU 100 changes the display direction of the execution screen according to a change in the posture of the cellular phone 1.

If determining that the application is deactivated (S107 YES), the CPU 100 closes the execution screen (S108). For example, if the application is deactivated by performing an operation for shifting to the home screen, the CPU 100 displays the home screen on the display 11. The CPU 100 monitors again whether any application is activated (S101). Then, if an application is newly activated (S101: YES), the CPU 100 displays the execution screen for the application on the display 11 in a display direction according to the posture of the cellular phone 1 (S102 and S103).

If a plurality of applications is executed and the execution screen for one of the applications is displayed, when the user uses a task bar or the like to perform an operation for switching active applications, the application for which the execution screen was displayed is deactivated. Accordingly, the execution screen for the application is closed (S108). Instead, the switched application is activated and the execution screen for the application is displayed on the display 11 in a display direction according to the posture of the cellular phone 1 (S102 and S103).

Next, the lock mode setting/cancelling process will be described. The CPU 100 performs the lock mode setting/cancelling process in parallel to the foregoing display direction switching process.

Referring to FIG. 4B, the CPU 100 monitors whether any application is activated (S201). If determining that an application is activated (S201: YES), the CPU 100 sets the lock flag to "0" to cancel the lock mode (S202).

Next, the CPU 100 determines whether the cellular phone 1 has rotated one time according to changes in acceleration signals from the acceleration sensor 108 (S203). For example, the cellular phone 1 rotates one time in a direction around a Z axis shown in FIG. 1A. In this case, the CPU 100 determines that the cellular phone 1 has rotated one time if detecting that the cellular phone 1 has turned in one direction to change from portrait to portrait orientations and then further turned in the same direction to return to portrait orientation.

In the embodiment, an action of allowing the cellular phone 1 to rotate one time is defined as an operation for switching the lock mode. While the lock mode is cancelled, the action of allowing the cellular phone 1 to rotate one time constitutes an operation for setting the lock mode. If the user wishes to set the lock mode so that the display direction of the execution screen is not changed even if the posture of the cellular phone 1 is changed, the user allows the cellular phone to rotate one time in a state where the lock mode is cancelled.

If determining that the cellular phone 1 has rotated one time (S203: YES), the CPU 100 determines the status of the lock flag (S204). If the lock flag is set to "0" and the lock mode is cancelled (S204: YES), the CPU 100 sets the lock flag to "1" (S205). Accordingly, the lock mode is set. Then, as shown in FIGS. 6A and 6B, the CPU 100 displays a lock icon M1 indicative of the setting of the lock mode, at a predetermined position in the execution screen on the display 11 (S206).

If the lock mode is thus set, the CPU 100 determines that the lock flag is set to "1" at step S104 of the display direction switching process (S104: NO) as described above, and therefore the display direction of the execution screen is not changed anymore even if the posture of the cellular phone is changed.

If the lock mode is set, the action of allowing the cellular phone 1 to rotate one time constitutes an operation for cancelling the lock mode. If the user wishes to cancel the lock mode, the user allows the cellular phone 1 to rotate one time in a state where the lock mode is set.

In this case, if determining that the cellular phone 1 has been rotated one time (S203: YES), the CPU 100 sets the lock flag to "0" (S207) since the lock flag was set at "1" previously (S204: NO). Accordingly, the lock mode is cancelled. Then, the CPU 100 erases the lock icon M1 from the execution screen on the display 11 (S208).

Accordingly, if the lock mode is cancelled, the CPU 100 determines that the lock flag is set to "0" at step S104 of the display direction switching process (S104: YES), and thus the CPU 100 changes the display direction of the execution screen according to a change in the posture of the cellular phone 1 (S106).

The CPU 100 repeats steps S203 to S208 until the application for which the execution screen is currently displayed is deactivated (S209: NO), and switches the lock mode every time the cellular phone 1 is rotated.

If determining that the application for which the execution screen is currently displaying is deactivated (S209: YES), the CPU 100 monitors whether any application is newly activated (S201). Then, if an application is newly activated (S201: YES), the CPU 100 sets the lock flag to "0" (S202). Accordingly, even if the lock mode is set while the execution screen for the previous application is displayed, the lock mode is cancelled when the execution screen for the new application is displayed.

As in the foregoing, according to the embodiment, the lock mode is provided so as not to switch the display direction of the execution screen for an application even if the posture of the cellular phone 1 is changed. The user can set the lock mode as necessary. This makes it possible to prevent the display direction of the execution screen from being switched without discretion.

Further, according to the embodiment, the lock mode is set while the execution screen is displayed on the display 11. This eliminates the need for shifting from the execution screen to the setting screen, setting the lock mode, and then returning to the execution screen, unlike in a configuration where the lock mode is set using the setting screen. Accordingly, it is possible to save the user from performing excessive operations.

In addition, according to the embodiment, the lock mode is cancelled when the execution screen for another application is displayed on the display 11. This eliminates the need for the user to cancel the lock mode for the previous application whenever using another application under a situation where the display direction does not need to be locked. This results in improvement of user operability.

Modification Example 1

FIG. 7 is a flowchart showing a flow of a lock mode setting/cancelling process according to modification example 1.

In the modification example, if it is considered that the cellular phone 1 is placed under a situation where the display direction of an execution screen may be changed without discretion, the lock mode is automatically set regardless of the presence or absence of the user's setting operation.

In the modification example, when the posture of the cellular phone 1 is changed, the CPU 100 measures time taken until the posture is changed again, using the clock 109.

Referring to FIG. 7, the CPU 100 determines that one application is activated (S301: YES) and sets the lock flag to "0" (S302), and then monitors whether the display direction of the execution screen is changed (S303). If determining that the display direction of the execution screen is changed (S303: YES), the CPU 100 then determines whether time taken from the previous to current changes of the display direction falls within a specified period of time (for example, several seconds to several tens of seconds) (S304). The specified period of time is predetermined in consideration of time required for the user to, if the display direction is changed without discretion, return the changed display direction to the previous one.

If determining that the taken time falls within the specified period of time (S304: YES), the CPU 100 then determines whether the number of times when the display direction is changed within the specified period of time (hereinafter, "the number of direction changes") has reached a specified number of times (S305). The number of direction changes is counted by a counter provided in the CPU 100.

If the number of direction changes has reached the specified number of times, it is considered that the cellular phone 1 is placed under a situation where the orientation may be changed without discretion. Accordingly, if determining that the number of direction changes has reached the specified number of times (S305: YES), the CPU 100 sets the lock flag to "1" (S306). Accordingly, the lock mode is set. Further, the CPU 100 displays the lock icon M1 at a predetermined position in the execution screen on the display 11 (S307).

Accordingly, if the lock mode is set, the display direction of the execution screen is not changed even if the posture of the cellular phone 1 is changed.

When the lock mode is set, the CPU 100 monitors whether an operation for cancellation of the lock mode is performed (S308). The operation for cancellation may be performed by rotating the cellular phone 1 one time, for example, as in the foregoing embodiment.

If determining that the operation for cancellation is performed (S308: YES), the CPU 100 sets the lock flag to "0" (S309). Accordingly, the lock mode is cancelled. Further, the CPU 100 erases the lock icon M1 from the execution screen on the display 11 (S310).

Accordingly, if the lock mode is cancelled, the display direction of the execution screen is changed according to a change in the posture of the cellular phone 1.

The CPU 100 monitors whether the application for which the execution screen is currently displaying is deactivated, for a period of time during which the lock mode is set and for a period of time during which the lock mode is cancelled (S311 and S312). If determining that the application is deactivated (S311: YES, and S312: YES), the CPU 100 monitors whether any application is newly activated (S301).

If an application is newly activated (S301: YES), the CPU 100 sets the lock flag to "0" (S302). Accordingly, even if the lock mode is set while the execution screen for the previous application is displayed, the lock mode is cancelled when the execution screen for the new application is displayed.

As in the foregoing, according to the modification example, the lock mode is set if the action of returning the switched display direction of the execution screen to the original direction within the specified period of time is performed the specified number of times, that is, if it is considered that the cellular phone 1 is placed under a situation where the display direction of the execution screen may be switched without discretion. This makes it possible to prevent the display direction of the execution screen from being switched without discretion. In addition, it is possible to prevent the posture of the cellular phone 1 from being detected unnecessarily and to save electric power taken for switching of the display direction of the execution screen.

Further, according to the modification example, the lock mode is set while the execution screen is displayed on the display 11. This eliminates the need for shifting from the execution screen to the setting screen, setting the lock mode, and then returning to the execution screen, unlike in a configuration where the lock mode is set using the setting screen. In addition, the lock mode is automatically set through a determination on whether the number of direction changes has reached the specified number of times, which does not require the user to perform a setting operation. Accordingly, it is possible to save the user from performing excessive operations.

Moreover, according to the modification example, the lock mode is cancelled when the execution screen for another application is displayed on the display 11. This eliminates the need for the user to cancel the lock mode for the previous application whenever using another application under a situation where the display direction does not need to be locked. This results in improvement of user operability.

Modification Example 2

FIG. 8 is a flowchart showing a flow of a lock mode setting/cancelling process according to modification example 2.

In the modification example, the lock mode is automatically set regardless of the presence or absence of the user's setting operation, if it is considered that the current posture of the cellular phone 1 is suitable for the user with the current display of the execution screen.

Referring to FIG. 8, if determining that any application is activated (S401: YES) and setting the lock flag to "0" (S402), the CPU 100 measures lock time (S403). The lock time refers to a period of time during which the display direction of the execution screen is maintained without being switched.

Next, the CPU 100 determines whether the lock time has reached a specified period of time (for example, several minutes) (S404). If the lock time has not reached the specified period of time (S404: NO), the CPU 100 then determines whether the display direction of the execution screen is changed (S405). If the display direction of the execution screen is not changed (S405: NO), the CPU 100 continues measuring the lock time (S403).

If the current posture of the cellular phone 1 is suitable for the user with the current display of the execution screen, the lock time will reach the specified period of time because the posture is maintained and the display direction of the execution screen is not changed.

If the lock time has reached the specified period of time without any change in the display direction of the execution screen (S404: YES), the CPU 100 sets the lock flag to "1" (S406). Accordingly, the lock mode is set. Further, the CPU 100 displays the lock icon M1 at a predetermined position in the execution screen on the display 11 (S407).

Accordingly, if the lock mode is set, the display direction of the execution screen is not changed even if the posture of the cellular phone 1 is changed.

If the posture of the cellular phone 1 is changed and the display direction of the execution screen is changed before the lock time reaches the specified period of time (S405: YES), the lock time is reset (S408) and then is measured from the beginning (S403).

If the lock mode is set, the CPU 100 monitors whether the cancellation operation for cancelling the lock mode is performed (S409). The cancellation operation may be performed by rotating the cellular phone 1 one time, for example, as in the foregoing embodiment.

If determining that the cancellation operation is performed (S409: YES), the CPU 100 sets the lock flag to "0" (S410). Accordingly, the lock mode is cancelled. Further, the CPU 100 erases the lock icon M1 from the execution screen on the display 11 (S411).

Accordingly, when the lock mode is cancelled, the display direction of the execution screen is changed according to a change in the posture of the cellular phone 1.

If determining that an application is deactivated (S412: YES, and S413: YES), the CPU 100 returns the process to step S401. If determining that any application is newly activated (S401: YES), the CPU 100 sets the lock flag to "0" (S402). Accordingly, even if the lock mode is set while the execution screen for the previous application is displayed, the lock mode is cancelled when the execution screen for the new application is displayed.

As in the foregoing, according to the modification example, the lock mode is set if the display direction of the execution screen is maintained for a specified period of time, that is, if it is considered that the current posture of the cellular phone 1 is suitable for the user with the current display of the execution screen. This makes it possible to prevent the display direction of the execution screen from being switched without discretion.

Further, according to the embodiment, the lock mode is set while the execution screen is displayed on the display 11. This eliminates the need for shifting from the execution screen to the setting screen, setting the lock mode, and then returning to the execution screen, unlike in a configuration where the lock mode is set using the setting screen. In addition, the lock mode is automatically set through a determination on whether the lock time has reached the specified period of time, which does not require the user to perform the setting operation. Accordingly, it is possible to save the user from performing excessive operations.

Moreover, according to the modification example, the lock mode is cancelled when the execution screen for another application is displayed on the display 11. This eliminates the need for the user to cancel the lock mode for the previous application whenever using another application under a situation where the display direction does not need to be locked. This results in improvement of user operability.

Modification Example 3

FIG. 9 is a flowchart showing a flow of a display direction switching process according to modification example 3.

In the foregoing embodiment, when the lock flag is set to "1" and the lock mode is set, the display direction of an execution screen is not changed even if the posture of the cellular phone 1 is changed, that is, the display direction of an execution screen is completely locked.

In contrast to this, in the modification example, if the lock mode is set, the display direction of an execution screen is less prone to be switched than in the case where the lock mode is cancelled.

In the modification example, step S108 is added to the display direction switching process shown in FIG. 4A.

Specifically, if determining at step S104 that the lock flag is set to "1" (S104: NO), the CPU 100 sets a detection sensitivity for detecting a change in the posture of the cellular phone 1 so as to be lowered in sensitivity when the lock mode is cancelled (S108). For example, the CPU 100 sets the foregoing vertical critical angle α and lateral critical angle β larger than those with the lock mode cancelled. The vertical critical angle α and lateral critical angle β with the lock mode cancelled are equivalent to a first threshold value of the present invention, and the vertical critical angle α and lateral critical angle β with the lock mode set, which are larger than those with the lock mode cancelled, are equivalent to a second threshold value of the present invention.

Accordingly, it is not detected that the posture of the cellular phone 1 is changed if the posture is not changed more largely. Accordingly, even if the posture of the cellular phone 1 is changed in the same manner as the case with the lock mode cancelled, the display direction of the execution screen is less prone to be switched.

When the lock mode is cancelled and the lock flag is switched from "1" to "0," the detection sensitivity is returned to the normal level.

In the configuration of the modification example, as in the foregoing embodiment, it is possible to prevent the display direction of the execution screen for an application from being switched without discretion.

Others

As in the foregoing, the embodiment is described. However, the present invention is not limited to the foregoing embodiment, and the embodiment of the present invention can be modified in various manners other than the foregoing ones.

For example, in the foregoing embodiment, the user's operation for setting the lock mode is performed by the action of rotating the cellular phone 1 one time. However, the setting operation is not limited to this but the setting operation is only required to be accepted by the CPU 100 in a state where the execution screen is displayed without switching to the setting screen for setting the lock mode.

Figure 10B:
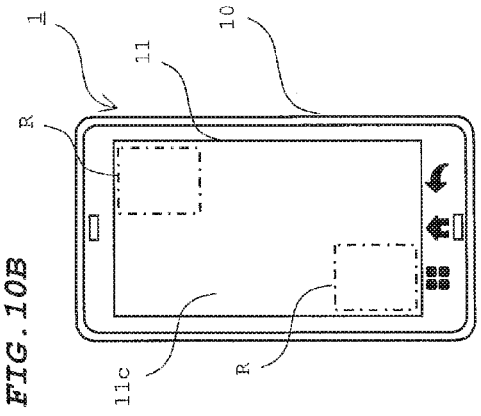
FIGS. 10A and 10B are diagrams for describing a lock mode setting/cancelling process according to another modification example.
Figure 10A:
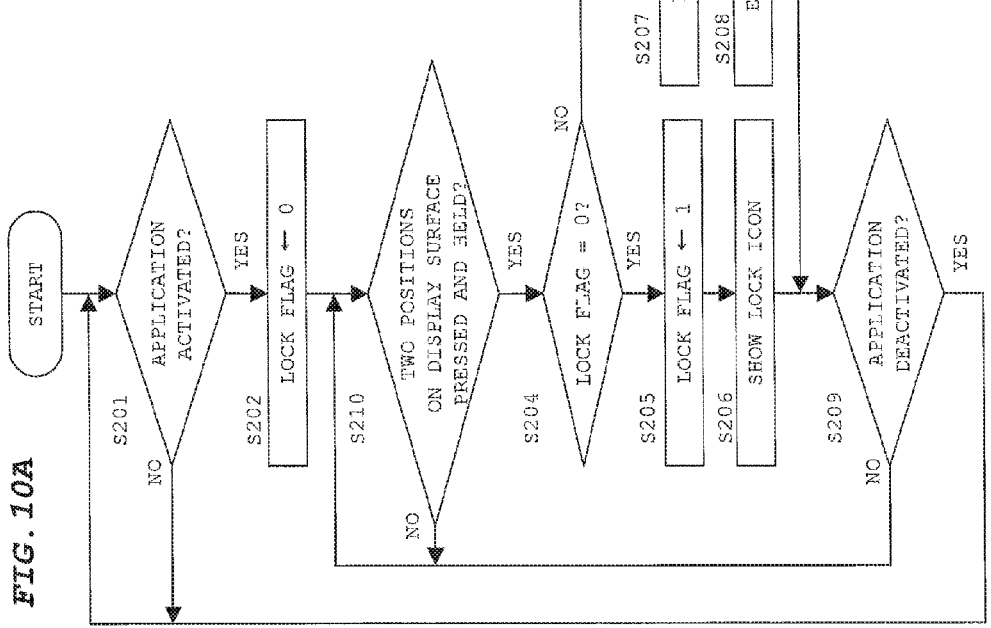

For example, the cancellation operation may be performed by concurrently pressing and holding two different positions on the display surface 11c. In this case, the lock mode setting/cancelling process shown in FIG. 10A is performed. If determining that two different positions are concurrently pressed and held on the display surface 11c (S210: YES) when the lock mode is cancelled, the CPU 100 sets the lock flag to "1" (S204: YES→S205). In this arrangement, as shown in FIG. 10B, regions R to be pressed and held may be set at positions diagonally opposite to each other on the display surface 11c. This allows the user to set the lock mode by performing an intuitive operation as if to hold ends of the execution screen to lock the execution screen.

Besides, a specific operation on one of the touch keys 13a to 13c (for example, pressing and holding) may be set as the setting operation.

Among the lock mode setting/cancelling process (FIG. 4B) in the foregoing embodiment, the lock mode setting/cancelling process in the foregoing modification example 1 (FIG. 7), and the lock mode setting/cancelling process in the foregoing modification example 2 (FIG. 8), two of the lock mode setting/cancelling processes may be performed in parallel. Alternatively, the three lock mode setting/cancelling processes may be performed in parallel.

The CPU 100 may perform control for turning off the acceleration sensor 108 while the lock mode is set.

In the foregoing embodiment, the display direction of the execution screen for an application is switched according to the posture of the cellular phone 1. Thus, in the foregoing embodiment, it is required that at least the display direction of the execution screen for an application can be switched. As for the home screen and launcher screens before starting of the execution screen for an application, the display direction may be switched or not be switched according to the posture of the cellular phone 1. In addition, when the display direction is switched, the lock mode may be set.

Further, in the foregoing embodiment, the present invention is applied to a so-called straight cellular phone (smart phone). However, the present invention is not limited to this, but may also be applied to any other types of cellular phones such as a folded type and a slide type.

Further, the mobile terminal device of the present invention is not limited to a cellular phone but may be a personal digital assistant (PDA), a tablet PC, an electronic book terminal, or the like.

Besides, the embodiment of the present invention can be modified as appropriate in various manners within the scope of technical ideas disclosed in the claims.

What is claimed is:

1. A device comprising:
   a display configured to display a first screen for a first application;
   a sensor configured to detect a gravity acceleration; and
   at least one controller configured to
   detect a posture of the device based on a gravity acceleration applied to the device,
   when a first condition is satisfied, control a display direction of the first screen according to the posture, and,
   when a second condition is satisfied, not control the display direction of the first screen according to the posture, and add an indication to a predetermined position on a portion of the display without relying on the first application, wherein the indication comprises a first image that indicates that the second condition is satisfied,
   wherein the display, when a second application is executed after the first application is executed, displays a second screen for the second application in place of the first screen, and displays at least one second image on the second screen,
   wherein the at least one controller controls a display direction of at least a part of the at least one second image according to the posture, and wherein the at least one controller, when the display displays the second screen and the posture is changed, switches the display direction of at least a part of the at least one second image according to the changed posture.

2. The device according to claim 1, wherein the second application is executed when the second condition is satisfied.

3. The device according to claim 1, wherein the second image comprises a word and a software button.

4. The device according to claim 1, wherein the at least one controller, when the second condition is satisfied and the posture is changed, does not switch the display direction of the first screen according to the changed posture.

5. The device according to claim 1, wherein the second condition is satisfied when an operation by a user is accepted.

6. A non-transitory storage medium having a computer program stored thereon, wherein the computer program, when executed by a processor of a device comprising a display that displays a first screen for a first application, and a sensor configured to detect a gravity acceleration, causes the processor to:
   detect a posture of the device based on a gravity acceleration applied to the device;
   when a first condition is satisfied, control a display direction of the first screen according to the posture;
   when a second condition is satisfied, not control the display direction of the first screen according to the posture, and add an indication to a predetermined position on a portion of the display without relying on the first application, wherein the indication comprises a first image that indicates that the second condition is satisfied; and,
   when a second application is executed after the first application is executed,
      display a second screen for the second application in place of the first screen, and display at least one second image on the second screen,
      control a display direction of at least a part of the at least one second image according to the posture, and,
      when the display displays the second screen and the posture is changed, switch the display direction of at least a part of the at least one second image according to the changed posture.

7. A display control method for a device comprising a display that displays a first screen for a first application, and a sensor configured to detect a gravity acceleration, wherein the method comprises:
   detecting a posture of the device based on a gravity acceleration applied to the device;
   when a first condition is satisfied, controlling a display direction of the first screen according to the posture;
   when a second condition is satisfied, not controlling the display direction of the first screen according to the posture, and adding an indication to a predetermined position on a portion of the display without relying on the first application, wherein the indication comprises a first image that indicates that the second condition is satisfied; and,
   when a second application is executed after the first application is executed,
      displaying a second screen for the second application in place of the first screen, and displaying at least one second image on the second screen, controlling a display direction of at least a part of the at least one second image according to the posture, and, when the display displays the second screen and the posture is changed, switching the display direction of at least a part of the at least one second image according to the changed posture.

* * * * *